(12) United States Patent
Jouppi et al.

(10) Patent No.: US 8,824,730 B2
(45) Date of Patent: Sep. 2, 2014

(54) SYSTEM AND METHOD FOR CONTROL OF VIDEO BANDWIDTH BASED ON POSE OF A PERSON

(75) Inventors: Norman Paul Jouppi, Palo Alto, CA (US); Subramoniam Narayana Iyer, Fremont, CA (US); April Marie Slayden, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2757 days.

(21) Appl. No.: 10/755,070

(22) Filed: Jan. 9, 2004

(65) Prior Publication Data

US 2005/0152447 A1 Jul. 14, 2005

(51) Int. Cl.
G06K 9/00 (2006.01)
H04N 7/14 (2006.01)
H04N 7/26 (2006.01)
H04N 7/50 (2006.01)
H04N 5/272 (2006.01)
H04N 7/46 (2006.01)
H04N 5/232 (2006.01)

(52) U.S. Cl.
CPC .......... *H04N 7/465* (2013.01); *H04N 7/26276* (2013.01); *H04N 7/50* (2013.01); *H04N 5/272* (2013.01); *G06K 9/00255* (2013.01); *H04N 5/23238* (2013.01); *H04N 7/26111* (2013.01); *H04N 7/26122* (2013.01)
USPC ...................... 382/103; 348/14.01; 348/14.16

(58) Field of Classification Search
USPC ............................. 348/14.01–14.16; 382/103
See application file for complete search history.

(56) References Cited

U.S. PATENT DOCUMENTS

| | | | | |
|---|---|---|---|---|
| 4,829,574 A | * | 5/1989 | Dewhurst et al. | 704/236 |
| 5,274,445 A | | 12/1993 | Overton et al. | |
| 5,280,530 A | * | 1/1994 | Trew et al. | 382/103 |
| 5,313,280 A | | 5/1994 | Straus | |
| 5,500,671 A | * | 3/1996 | Andersson et al. | 348/14.1 |
| 5,874,991 A | | 2/1999 | Steinberg et al. | |
| 5,920,340 A | | 7/1999 | Man et al. | |
| 6,160,573 A | * | 12/2000 | Allen et al. | 348/14.08 |
| 6,172,703 B1 | * | 1/2001 | Lee | 348/14.08 |
| 6,292,713 B1 | * | 9/2001 | Jouppi et al. | 700/245 |
| 6,323,828 B1 | | 11/2001 | Perez | |
| 6,330,022 B1 | * | 12/2001 | Seligmann | 348/14.08 |
| 6,337,710 B1 | | 1/2002 | Watkins | |
| 6,346,950 B1 | * | 2/2002 | Jouppi | 345/660 |
| 6,606,111 B1 | * | 8/2003 | Kondo et al. | 348/14.01 |
| 6,608,644 B1 | * | 8/2003 | Kondo et al. | 348/14.09 |

(Continued)

OTHER PUBLICATIONS

Jouppi et al., "Method of and System for Determining Angular Orientation of an Object", U.S. Appl. No. 10/696,238, filed Oct. 28, 2003.

(Continued)

*Primary Examiner* — Chikaodili E Anyikire

(57) ABSTRACT

A system and method for control of video bandwidth based on the pose of a person. In one embodiment, a plurality of video streams is obtained that are representative of images at a first location. The video streams are communicated from the first location to a second location. A pose of the head of a person is determined wherein the person is at one of the first location and the second location. The images at the second location are displayed, wherein bandwidth for communication of the video streams is allocated among the video streams based on the pose of the head of the person.

33 Claims, 8 Drawing Sheets

(56) References Cited

U.S. PATENT DOCUMENTS

| | | | | |
|---|---|---|---|---|
| 6,677,979 B1* | 1/2004 | Westfield | | 348/14.12 |
| 6,677,980 B1* | 1/2004 | Jeon | | 348/14.16 |
| 6,914,622 B1* | 7/2005 | Smith et al. | | 348/14.05 |
| 7,092,001 B2* | 8/2006 | Schulz | | 348/14.05 |
| 7,123,285 B2* | 10/2006 | Smith et al. | | 348/14.05 |
| 7,154,526 B2* | 12/2006 | Foote et al. | | 348/14.08 |
| 7,227,976 B1* | 6/2007 | Jung et al. | | 382/103 |
| 7,272,243 B2* | 9/2007 | Toyama | | 382/103 |
| 7,388,981 B2* | 6/2008 | Jouppi | | 382/154 |
| 2002/0113862 A1* | 8/2002 | Center et al. | | 348/14.08 |
| 2002/0118861 A1* | 8/2002 | Jouppi et al. | | 382/103 |
| 2002/0141595 A1 | 10/2002 | Jouppi | | |
| 2004/0027451 A1* | 2/2004 | Baker | | 348/46 |
| 2004/0109001 A1* | 6/2004 | Grandine et al. | | 345/442 |

OTHER PUBLICATIONS

Jouppi, "Telepresence System With Automatic Preservation of User Head Size", U.S. Appl. No. 10/376,435, filed Feb. 27, 2003.

* cited by examiner

SYSTEM AND METHOD FOR CONTROL OF VIDEO BANDWIDTH BASED ON POSE OF A PERSON

FIELD OF THE INVENTION

The present invention relates to the field of video display. More particularly, the present invention relates to the field of video display for telepresence systems in which a display booth provides an immersion scene from a remote location.

BACKGROUND OF THE INVENTION

Telepresence systems allow a user at one location to view a remote location (e.g., a conference room) as if they were present at the remote location. Mutually-immersive telepresence system environments allow the user to interact with individuals present at the remote location. In a mutually-immersive environment, the user occupies a display booth, which includes a projection surface that typically surrounds the user. Cameras are positioned about the display booth to collect images of the user while other cameras are positioned at the remote location to collect images of the remote location. Live color images of the user are transmitted to the remote location, concurrent with projection of live video on the projection surface surrounding the user and reproduction of sounds from the remote location. A surrogate at the remote location shows images of the user and reproduces the user's voice at the remote location.

Projecting video images on multiple sides of the user or surrounding the user is important for providing the user a strong sense of immersion in the remote location. In addition, it allows the user to look all around the remote location without having to use tele-operated motion of remote cameras, which is highly unimmersive. Similarly, it is important to display multiple sides of the user at the remote location so that people on all sides of the surrogate can tell what the user is looking at.

Transmission of multiple streams of high quality video between the remote location and the location of the user would consume significant bandwidth. For example, even with state-of-the-art video compression techniques, over 20 Mb/s may be required to present the remote location at a visual acuity permitting 20/100 vision over a 360 degree horizontal field of view at 15 frames-per-second (fps). This bandwidth requirement can preclude the use of such telepresence systems in certain circumstances, such as where communications occur over wireless networks or transoceanic cables.

Therefore, what is needed is a technique for reducing the bandwidth required in transmitting video images. What is further needed is such a technique for a telepresence system in which an immersive environment is maintained.

SUMMARY OF THE INVENTION

The present invention provides a system and method for control of video bandwidth based on the pose of a person. In one embodiment, a plurality of video streams is obtained that are representative of images at a first location. The video streams are communicated from the first location to a second location. A pose of the head of a person is determined wherein the person is at one of the first location and the second location. The images at the second location are displayed, wherein bandwidth for communication of the video streams is allocated among the video streams based on the pose of the head of the person.

In another embodiment, a video display system includes a display apparatus and a computer system. The display apparatus has a plurality of display areas for displaying video images to a person. The computer system determines a pose of the head of the person and controls quality of the video images displayed by each display area based on the pose of the head of the person.

These and other aspects of the invention are described in more detail herein.

DETAILED DESCRIPTION OF A PREFERRED EMBODIMENT

Figure 1:
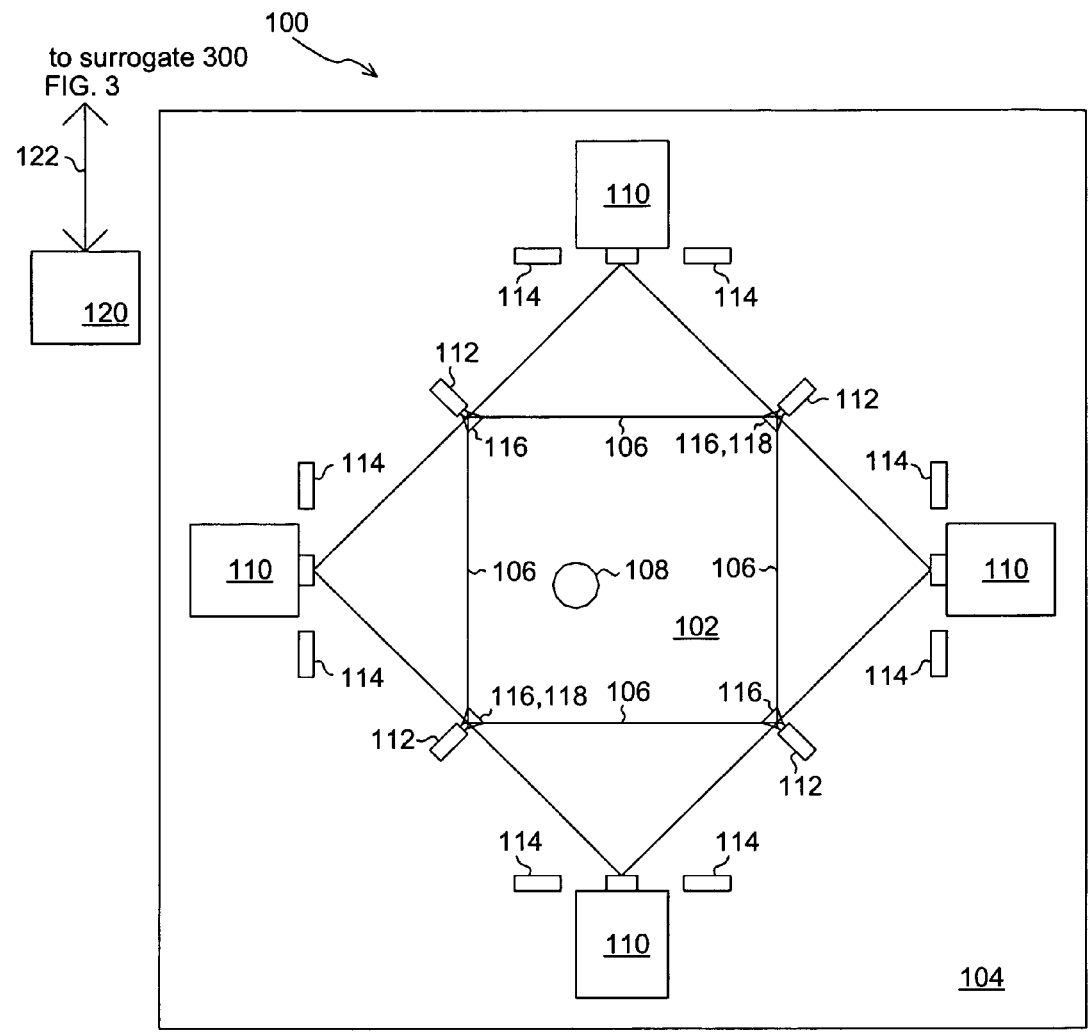
FIG. 1 is a schematic top view of a display apparatus used in the mutually-immersive telepresence system in accordance with an embodiment of the present invention.

The present invention provides a system and method for control of video bandwidth based on the pose of a person viewing video images. As used herein, the term pose refers to one or more pose variables. Possible pose variables include position (e.g., in X and Y, or in X, Y and Z coordinates), roll, pitch and/or yaw. Here, roll refers to leaning of the person's head to one side or the other, while pitch refers to the vertical orientation or up-and-down direction in which the person is facing. Yaw refers to the horizontal orientation or side-to-side direction in which the person is facing. The invention is particularly useful for telepresence systems, including mutually-immersive telepresence systems. Video images are displayed at multiple sides of the person and preferably surrounding the person. The person viewing the video images is expected to pay the most attention to images being displayed directly in front of the person. Images displayed at the sides of the person are generally in the periphery of the person's vision and thus the person will be paying less attention to these areas. Further, the person will be paying little or no attention to images being displayed behind the person. Thus, in accordance with an embodiment of the present invention, a larger portion of the bandwidth available for displaying images is devoted to display of images in front of the person viewing the images, while smaller portions of the bandwidth are devoted to display of images at the sides of the person and behind the person. As a result, the quality of video images displayed in front of the person is greater than for other display areas.

At the remote location of a telepresence system, such as in a conference room, images of the person using the system are displayed by a surrogate. Other people interacting with the user may be positioned at various sides of the surrogate. It is desired to display all sides of the person using the system so that the people interacting with the person can tell what the user is looking at. However, the person's face is expected to convey more information than the sides of the person's head while the sides of the person's head are expected to convey more information than the back of the person's head. Thus, in accordance with an embodiment of the present invention, a larger portion of the bandwidth available for displaying images of a person is devoted to display of images of the front of the person's head, while smaller portions of the bandwidth are devoted to display of images of the sides and back of the person's head.

In an exemplary mutually-immersive telepresence system, a "local" user is positioned within a display apparatus. A display screen is positioned at each of four sides of the display apparatus. A projector for each display screen provides a video image of the remote location. Camera units may be positioned to obtain images from all sides of the person's head. The pose of the person's head is determined. In one embodiment, the bandwidth devoted to images of the remote location that are displayed for the person may be controlled based on the orientation of the person's head. In another embodiment, the bandwidth devoted to display of images of the person at the remote location may be controlled based on the orientation of the person's head.

Bandwidth usage can be controlled through several techniques that affect image quality, including, but not limited to, frame rate, resolution or contrast. These techniques may be used individually or in combination.

In a preferred embodiment, the angular orientation of the person's head is used for controlling the bandwidth allocations in the horizontal plane. However, in other embodiments, the vertical orientation of the person's head may be used to control bandwidth allocations in other directions.

Instead of, or in addition to, controlling bandwidth based on orientation, location information may be used to control bandwidth. For example, if the person's head is closer to a particular display screen, then higher bandwidth could be directed to that screen with lower bandwidth directed to screens that are further from the user.

When the person moves his/her head, his/her pose changes. Accordingly, the pose of the person's head is preferably tracked continuously and the bandwidth allocations are repeatedly adjusted based on newly determined orientations of the person's head.

While the pose of the person's head may be determined in a number of ways, including having the person wear position or orientation-indicating apparatus, in a preferred embodiment, the pose of the person's head is determined from images obtained of the person's head. More particularly, near-infrared cameras obtain a still image of the display apparatus with the person absent (i.e. a baseline image). Then, when the person is present in the display apparatus, the baseline image is subtracted from images newly obtained from four sides of the person's head by the near-infrared cameras. The resulting difference images show only the person. For determining position of the person's head, the foreground image may be scanned from top to bottom in order to determine the location of the user's head. An angle between the center of the image and the user's head can be determined by a processor comparing the position of the user's head to the horizontal and/or vertical fields of view of the camera. Trigonometry can then be applied to such data obtained from two or more images to determine the position of the user's head in two or three dimensions. For determining orientation of the person's head, luminance values at the expected eye level of each view of the person's head obtained from the images may be assigned to each of a plurality of positions in a polar plot. A centroid is then computed based on the assigned luminance values. The angle of the centroid with respect to the origin of the polar plot indicates the angular orientation of the object. This technique makes use of the fact that people's heads are generally symmetrical and that the luminance of the front of a person's head is distinguishable from the luminance of the back of the person's head, particularly at approximately the eye level and below.

A plan view of an embodiment of the display apparatus is illustrated schematically in FIG. 1. The display apparatus 100 comprises a display booth 102 and a projection room 104 surrounding the display booth 102. The display booth comprises display screens 106 which may be rear projection screens. The head 108 of a person using the device is depicted within the display booth 102. The projection room 104 comprises projectors 110, camera units 112, near infrared illuminators 114, and speakers 116. These elements are preferably positioned so as to avoid interfering with the display screens 106. Thus, according to an embodiment, the camera units 112 and the speakers 116 protrude into the display booth 102 at corners between adjacent ones of the display screens 106. Preferably, a pair of speakers 116 is provided at each corner, with one speaker being positioned above the other. Alternately, each pair of speakers 116 may be positioned at the middle of the screens 106 with one speaker of the pair being above the screen and the other being below the screen. In a preferred embodiment, two subwoofers 118 are provided, though one or both of the subwoofers may be omitted. One subwoofer is preferably placed at the intersection of two screens and outputs low frequency signals for the four speakers associated with those screens. The other subwoofer is placed opposite from the first, and outputs low frequency signals associated with the other two screens.

A computer 120 is coupled to the projectors 110, the camera units 112, and the speakers 116. Preferably, the computer 120 is located outside the projection room 104 in order to eliminate it as a source of unwanted sound. The computer 120 provides video signals to the projectors 110 and audio signals to the speakers 116 received from the remote location via a communication channel 122. For example, the channel 122 may be provided by a telecommunications network. The computer also collects images of the user 108 via the camera units 112 and sound from the user 108 via one or more microphones (not shown), which are transmitted to the remote location via the communication channel 122. Audio signals may be collected using a lapel microphone attached to the user 108.

In operation, the projectors 110 project images onto the projection screens 106. The surrogate at the remote location provides the images. This provides the user 108 with a surrounding view of the remote location. The images on the projection screens are preferably presented at approximately "life size" to aid for preserving the gaze of the participants. The near infrared illuminators 114 uniformly illuminate the rear projection screens 106. Each of the camera units 112 comprises a color camera and a near infrared camera. The near infrared cameras of the camera units 112 detect the rear projection screens 106 with a dark region corresponding to the user's head 108. This provides a feedback mechanism for collecting images of the user's head 108 via the color cameras of the camera units 112 and provides a mechanism for tracking the location of the user's head 108 within the apparatus.

Figure 2:
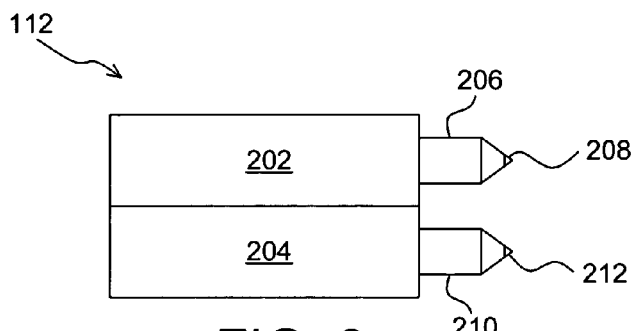
FIG. 2 is a schematic view of the camera unit used in the display apparatus illustrated in FIG. 1.

An embodiment of one of the camera units 112 is illustrated in FIG. 2. The camera unit 112 comprises the color camera 202 and the near infrared camera 204. The color camera 202 comprises a first extension 206, which includes a first pin-hole lens 208. The near infrared camera 204 comprises a second extension 210, which includes a second pin-hole lens 212. The near-infrared camera 204 obtains a still image of the display apparatus with the user absent (i.e. a baseline image). Then, when the user is present in the display apparatus, the baseline image is subtracted from images newly obtained by the near-infrared camera 204. The resulting difference images show only the user and can be used to determine the position of the user, as explained herein. This is referred to as difference keying. The difference images are also preferably filtered for noise and other artifacts (e.g., by ignoring difference values that fall below a predetermined threshold).

Figure 3:
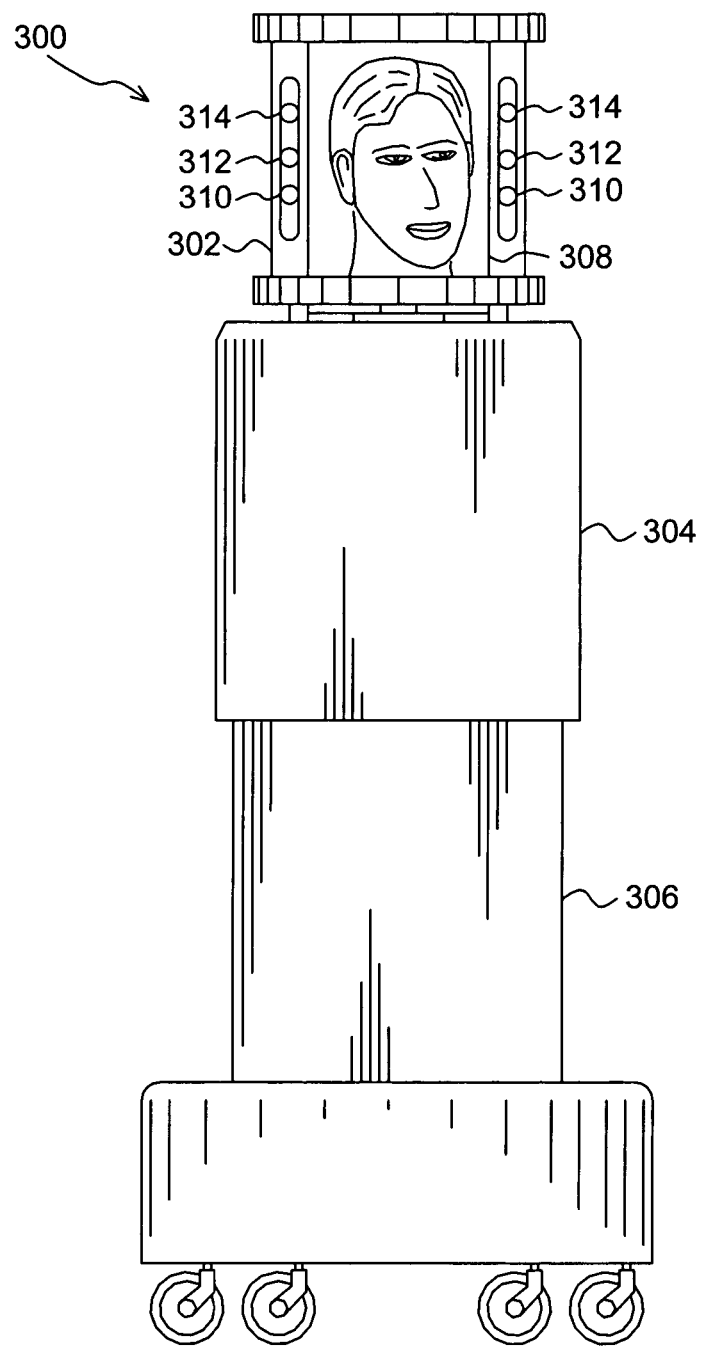
FIG. 3 is a view of a surrogate in accordance with an embodiment of the present invention.

An embodiment of the surrogate is illustrated in FIG. 3. The surrogate 300 comprises a surrogate head 302, an upper body 304, a lower body 306, and a computer (not shown). The surrogate head comprises a surrogate face display 308, a speaker 310, a camera 312, and a microphone 314. Preferably, the surrogate face display comprises an LCD panel. Alternatively, the surrogate face display comprises another display such as a CRT display. Preferably, the surrogate 300 comprises four of the surrogate face displays 308, four of the speakers 310, four of the cameras 312, and four of the microphones 314 with a set of each facing a direction orthogonal to the others. Alternatively, the surrogate 300 comprises more or less of the surrogate face displays 308, more or less of the speakers 310, more or less of the cameras 312, or more or less of the microphones 314.

In operation, the surrogate 300 provides the video and audio of the user to the remote location via the face displays 308 and the speakers 310. The surrogate 300 also provides video and audio from the remote location to the user 108 in the display booth 102 (FIG. 1) via the cameras 312 and the microphones 314. As mentioned, a communication channel 122 (FIG. 1) couples the display apparatus 100 and the surrogate 300 and transmits the audio and video between the two locations. The upper body 304 moves up and down with respect to the lower body 306 in order to simulate a height of the user at the remote location.

According to an embodiment of the display apparatus 100 (FIG. 1), walls and a ceiling of the projection room 104 are covered with anechoic foam to improve acoustics within the display booth 102. Also, to improve the acoustics within the display booth 102, a floor of the projection room 104 is covered with carpeting. Further, the projectors 110 are placed within hush boxes to further improve the acoustics within the display booth 102. Surfaces within the projection room 104 are black in order to minimize stray light from the projection room 104 entering the display booth 102. This also improves a contrast for the display screens 106.

Figure 4:
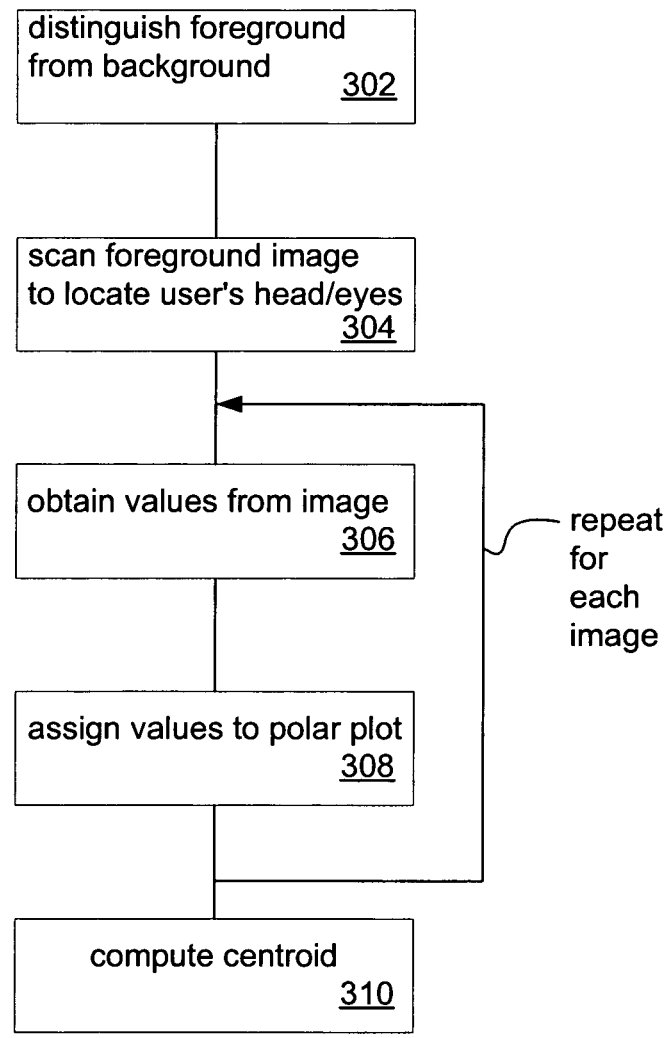
FIG. 4 is a flowchart illustrating a method for determining an angular orientation of a user's head in accordance with an embodiment of the present invention.

Processing steps performed to determine the angular orientation of the local user's head will now be discussed. FIG. 4 shows an exemplary flowchart of a method for determining an angular orientation of a user's head in accordance with an embodiment of the present invention. At the outset, it should be understood that the processing steps discussed below could be performed by any suitable processing device, such as computer(s) 120 (FIG. 1) configured to operated according to a stored software program. The processing steps can also be performed by a dedicated computing device, such as an application specific integrated circuit (ASIC) or the like. In an exemplary embodiment of the present invention, the processing devices are computers, each equipped with a video capture card that provides for image processing on a frame-by-frame basis. As discussed above, the rear projection screen 106 is uniformly illuminated with near-infrared light by the near-infrared illuminators 114. The video image of the remote location, if any, is then projected on to the rear projection screen 106 by the rear projector 110. The local user is positioned generally within the center of the display apparatus 100.

The foreground (e.g., the user's head 108) is distinguished from the background in step 302. This includes detecting luminance differences within the display apparatus 100. This is done through the use of the near-infrared pass, visible-cut cameras 112. As discussed above, each of the rear projectors 110 emit negligible amounts of light in the near-infrared spectrum. Thus, the color images provided by the rear projectors 110 have negligible impact on the luminance value of the rear projection screen 106 or what the near-infrared cameras 112 detect. As each of the near-infrared cameras 112 is equipped with visible-cut near-infrared pass filters, they are only capable of detecting light in the near-infrared spectrum. Thus, the changing color images on the rear projection screen 106 are not detected by the near-infrared cameras 112. An object within the display apparatus 100, for example the head 108 of the local user, having a different luminance value from the rear projection screen 106 is assumed to be in the foreground of the image. The video signals representing the background and foreground portions of the image are transmitted to the corresponding computer 120 for processing. The foreground and background images may also be displayed on a suitable monitor. Video signals displayed on a video monitor sometimes contain artifacts along the outer boundaries of the image. Such artifacts are ignored by the method of the present invention. This is referred to as overscan.

While difference keying using near-infrared is preferred for distinguishing foreground from background, it will be apparent that another technique may be used. For example, where the background is of uniform color, the foreground can be distinguished based on color differences. As another example, luminance keying may instead be used to detect the user, in which case, the near-infrared light provides the background that is used by the near-infrared camera 204 of camera units 112 in detecting the luminance difference between the head of the local user 108 and the rear projection screen 106. Any luminance detected by the near-infrared camera 204 outside a range of values specified as background is considered to be in the foreground. This is referred to as luminance keying. Also, while the image data used to obtain luminance values is preferably in the near-infrared, luminance values may be obtained at other wavelengths (e.g., in the visible spectrum).

Once the foreground has been distinguished from the background, the user's head may then be located in the image. The foreground image may be scanned in step 304 from top to bottom in order to determine the location of top of the local user's head. The foreground image may be scanned in a series of parallel lines (i.e. scan lines) until a predetermined number, h, of adjacent pixels within a scan line, having a luminance value within foreground tolerance are detected. In an exemplary embodiment, h equals 10. This detected region is assumed to be the top of the local user's head. By requiring a significant number of adjacent pixels to have similar luminance values, the detection of false signals due to video noise or capture glitches is avoided.

Then, a portion of the user's head preferably below the forehead and approximately at eye-level is located. This portion of a user's head is useful because the luminance values obtained from the user's face at this level will tend to exhibit substantial symmetry with respect to a vertical plane that divides the person's face. This measurement may be performed by moving a distance equal to a percentage of the total number of scan lines down from the top of the originally detected (captured) foreground image. The percentage used may be a user-definable parameter that controls how far down the image to move when locating this approximately eye-level portion of the user's head. In an exemplary embodiment of the present invention, a value of 10% is used. For example, if 480 scan lines were used to capture the foreground image, the method of the present invention causes the computer 120 to move forty eight scan lines down from the top of the user's head in the image to measure the width of the image, which is assumed to be the head of the local user.

The left edge of the foreground image may be identified by detecting the leftmost foreground pixel value of the scan line. The right edge of the foreground image is acquired by detecting the rightmost foreground pixel value of the scan line. The leftmost pixel value is subtracted from the rightmost pixel value to determine the width of the foreground image, which corresponds to the width of the local user's head at this level.

Luminance values may then be obtained in step 306 for the pixels that correspond the portion of the user's face located in step 304. The number of pixels in the obtained image at approximately eye-level may be given as P where the pixels of the image starting at the left-most edge of the user's head and ending at the right-most edge of the users' head are assigned numbers from one to P. A luminance value corresponds to each pixel.

Figure 5:
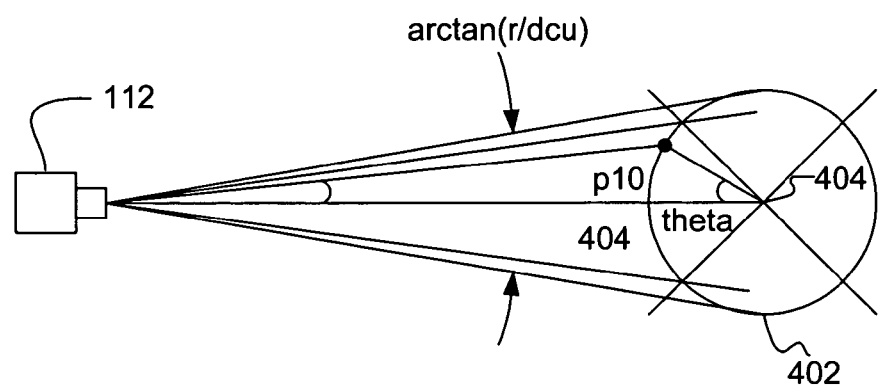
FIG. 5 is a schematic view of a camera viewing a user's head in the display apparatus of FIG. 1, seen from above in accordance with an embodiment of the present invention.
Figure 6A:
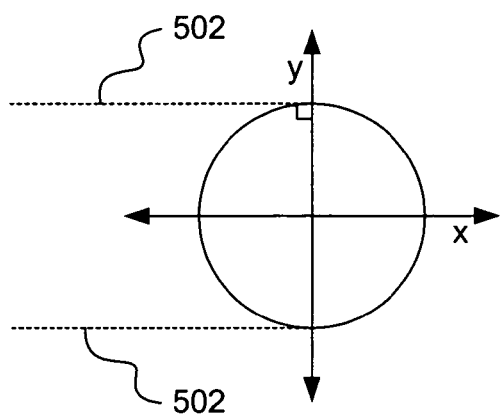
FIG. 6A shows rays from a camera intersecting an approximation of the user's head at a y-axis in accordance with an embodiment of the present invention.
Figure 6B:
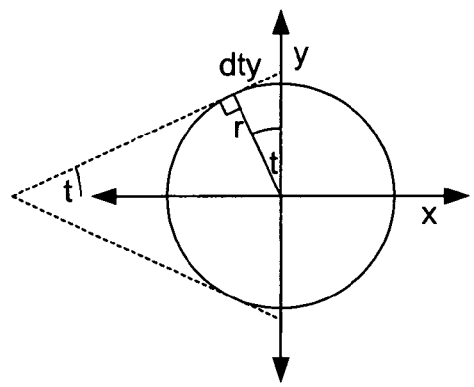
FIG. 6B shows the rays from the camera being tangent to the cylinder before the y-axis is reached in accordance with an embodiment of the present invention.
Figure 7:
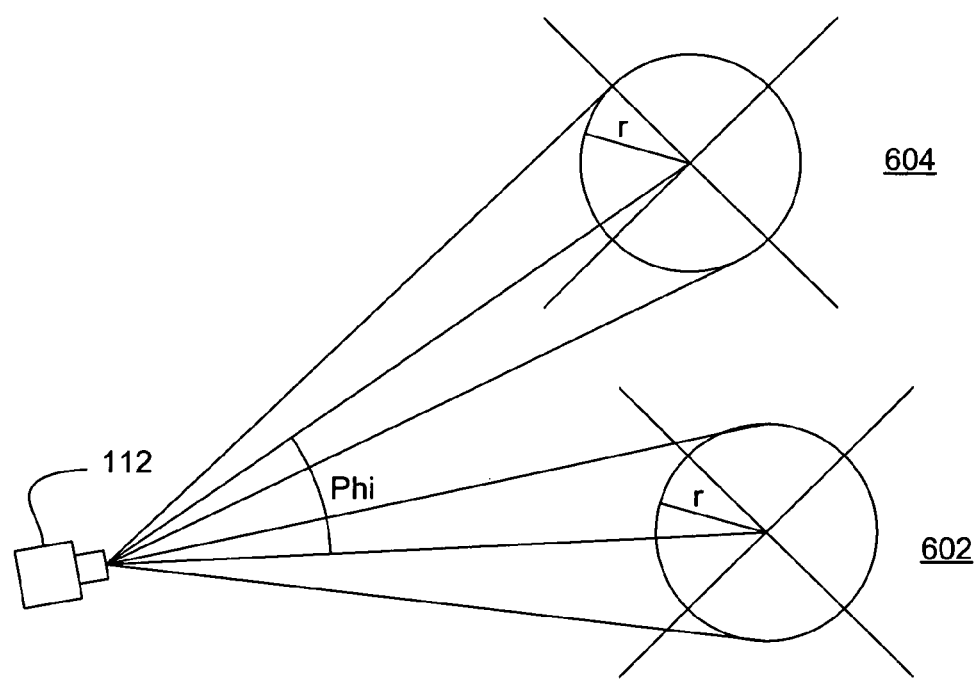
FIG. 7 shows that a part of the user's head seen by a camera changes if the person shifts to the left or right of the center of a camera's field of view in accordance with an embodiment of the present invention.

Then, in step 308, a luminance value is assigned to each position in a polar plot. This step essentially projects luminance values obtained from a two-dimensional image of the user's head onto a three-dimensional object that approximates the user's head. FIG. 5 shows a camera 112 (FIG. 1) viewing a user in the display apparatus 100, as seen from above. The user's head (including their hair) is approximated by a cylindrical section 402. In a preferred embodiment, the diameter of the cylindrical section 402 is ten inches, though it will be apparent that a larger or smaller diameter may be selected. An origin 404 is assigned to the cylindrical section 402 for the polar plot.

As mentioned, the width of the user's head (measured in pixels) is known (where the number of pixels is P). Each of the four cameras 112 faces a corresponding quadrant of the user's head. The quadrants for the polar plot are defined by the camera positions. For each position of interest in each quadrant (e.g., every degree), the position in the video image corresponding to that angle on the cylinder 402 is computed with respect to the origin 404. From this, its position in the polar plot is known.

It is also assumed that the user's head is roughly centered in the display apparatus 100, and thus, there is a distance of approximately three feet between the user's head to each of the cameras 112 in each of the four corners in the display apparatus 100. The radius r of the cylinder 402 in feet is given as: r=(10/2)/12=0.417 feet. The distance from the camera to the center of the user's head dcu is thus given by: dcu=3+(10/2)/12=3.417 feet. The center of the cylinder 402 is defined as the origin of an x and y axis. Assuming the camera and lens do not introduce perspective distortion (while not true, though this simplifies the calculations), the user's head would span an angle of 2*arctan(r/dcu)=2*arctan(0.417/3.417)=13.916 degrees. The P pixels of the user's head also span approximately the same angle, but as can be seen from FIG. 5, the mapping from rotational angle around the user's head to pixel position is a non-linear mapping.

As an example for one position in the polar plot, assume we are interested in a point p10 on the user's head that is 10 degrees clockwise looking down from above (i.e., to the left of the centerline as seen by the camera). From trigonometry and given the origin at the center of the user's head, this point would intersect the surface of the cylinder at coordinates of y=r*sin(theta)=0.417*sin(10)=0.0724 feet and x=−r*cos(theta)=−0.417*cos(10)=−0.411 feet. This point is at an angle of arctan(0.0724/3.417−0.411)=1.380 degrees left of the centerline of the camera. This angle, if extended to x=0, would have a y coordinate of 3.417*tan(100.380)=0.0823 feet. Given that the span of the user's head is 2*r=0.834 feet, which corresponds to P pixels, then point p10 on the user's head should be (0.0823/0.834)*P=0.0987*P pixels to the left of the center of the user's head in the obtained image.

Because the positions of interest in the polar plot are preferably spaced at uniform intervals (e.g., one degree), the positions do not generally coincide with the locations of pixels from the foreground image. If a pixel distance such as 0.0987*P has a fractional component (as will generally be the case), linear interpolation may be used to create a luminance value for the polar map. For example, if an angle maps to a desired value of 5.70 pixels from the center, then the desired luminance value is 0.70 times the value of pixel 6 from the center and 0.30 times the value of pixel 5 from the center. This also assumes there are an odd number of pixels in the cross section of the image of the user's head. Instead, if there is an even number of pixels, then there are an equal number of pixels on each side of the center, which is halfway between the P/2 and (P/2)+1th pixels, and the P/2th pixel is at a distance of 0.5 pixels from the center.

This process is repeated for each position of interest within each quadrant using each of the four images, one for each quadrant. Thus, the steps of scanning the image (step 304), obtaining the luminance values (step 306) and assigning luminance values to the polar plot (step 308) are repeated for each quadrant.

The outermost pixel in each camera's quadrant may be calculated as follows. This pixel is at an angle just less than 45 degrees clockwise beyond the centerline of the camera. This point is located at x=−0.417*cos(45)=−0.295 feet and y=0.417*sin(45)=0.295 feet. This yields an effective angle of arctan(0.295/3.417−0.295)=5.398 degrees. This angle intersects the y-axis at y=3.417*tan(5.398)=0.323 feet. Thus, the leftmost of the P pixels that contributes to the polar plot from this camera is (0.323/0.834)*P=0.387*P pixels from the center of the user's head in the image obtained from head tracking. A total of twice this value, or 0.387*2*P=0.775*P pixels, contribute to the polar plot from this camera in total. Then, once luminance values have been assigned to all of the positions of interest in the polar plot, a centroid is computed in step 310 from the assigned values. The centroid computation essentially determines a weighted average similar to a center of mass for the polar plot where the luminance values correspond to weights positioned about the circumference of the cylindrical section. The polar coordinates of each point in the polar plot may be converted to Cartesian (rectangular) coordinates, and all the x and y coordinates may be averaged together to compute the (x, y) coordinates of the centroid. Converting these coordinates back to polar coordinates yields the angular orientation of the user's head with respect to the origin of the polar plot.

Variance of luminance values may be determined and the centroid computed based on the luminance variance. This may be accomplished by computing variance of the luminance values obtained in a vertical span of the user's head for each angle position of interest in the polar plot. For example, the span may be approximately ⅓ of the width of the person's head centered at approximately eye- and ear-level. In areas such as the back of a person's head, the vertical variance at ear-level is quite low, as this area is usually covered by either a uniform area of hair or bare skin (in the case where the person is entirely bald). In contrast, there is usually significant vertical variance around a person's eyes, due to the shadows from their eye sockets and the whites of their eyes. A moderate amount of variance can occur around a person's ears, but this variance is generally balanced on either side of a person's head and, thus, will not affect the position of the centroid.

U.S. application Ser. No. 10/696,238, filed Oct. 28, 2003, and entitled, "Method of and System for Determining Angular Orientation of an Object," the entire contents of which are hereby incorporated by reference, describes such a technique for determining the orientation of the user's head.

Once the pose of the head of the user is determined, the bandwidth allocations can then be adjusted in response. Control of bandwidth usage may be effected by several means that affect the quality of the affected video stream. To the extent that reduced-quality streams are only in the peripheral vision of the user or behind their head, the reduction in quality does not significantly degrade the user's experience. A first bandwidth-reduction technique is to reduce the frame rate of the video stream. A second technique is to reduce the target bit rate of the video encoder to reduce spatial resolution. A third technique is to reduce the image size of the transmitted imagery, with synchronous increased magnification at the user's location to fill the same projection area. Other techniques include reducing the color resolution, transmitting only a monochrome image, or reducing the contrast of the image. Note that the techniques mentioned above are not mutually exclusive, so several techniques listed above can be applied at the same time.

Because users can move their eyes left and right +/−45 degrees within approximately a half second, the width of the viewing area having the greatest quality preferably covers at least a 90 degree field of view. This ensures that the foveas (the high-resolution central part) of the user's eyes will enjoy high-bandwidth imagery. However, people usually take several seconds to rotate their head by 180 degrees, especially if they are sitting. Thus, adjustments to the quality of images displayed for the user in response to movements of the user's head are preferably accomplished in several seconds or less.

The delay to effect a visible change in display quality is a function of many components. This depends on delay in tracking the user's head orientation, the bandwidth reduction technique being used, the latency of transmission of the angular orientation of the head to the remote location, the delay in resuming full bandwidth, and delays in transmitting the video from the remote location to the user (not to mention encoding, decoding, and display delays). As a result, several seconds may elapse between the rotation of the user's head and the changes in display quality attendant with changes in bandwidth. This can result in the user momentarily seeing a degraded image if they rotate their head quickly. However, this is expected to not be too disconcerting for users, and is a reasonable tradeoff compared to the benefits of the present invention.

In an embodiment, hardware video encoders are used whose target bit rate, frame size, contrast, or color/monochrome selection cannot be changed dynamically. For such an embodiment, controlling the frame rate of the bit stream is preferred since this can be accomplished transparently to the encoder. For example, an encoder may be set to encode for a high frame rate such as 30 fps. Then, as the bitstream is read from the encoder and sent over the network, frames are skipped to produce the desired frame rate and corresponding bandwidth reduction. Bandwidth requirements are reduced by skipping frames since data for the skipped frames need not be sent. Without loss of generality frame skipping techniques are discussed in the context of MPEG-2 video encoding. These bandwidth reduction techniques can also be applied to other types of coded bit streams, such as MPEG-1 or MPEG-4.

Figure 8:
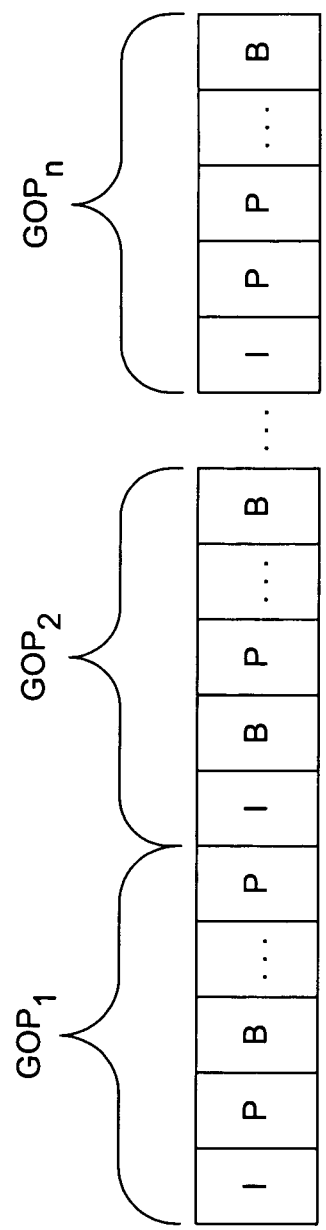
FIG. 8 shows an encoded video stream including a plurality of frames in which frames may be skipped in accordance with an embodiment of the present invention.

FIG. 8 illustrates a video stream encoded in accordance with MPEG-2. In a telepresence system having four display screens, four such MPEG-2 streams are delivered to the display booth, one for each screen. As shown in FIG. 8, the video stream includes a series of GOPs (Group of Pictures) including $GOP_1, GOP_2, \ldots, GOP_n$. Each GOP generally includes at least an I-frame and may also include P- and B-frames. I-frames include all of the information needed to reconstruct the entire frame while P- and B-frames require additional information obtained from other frames. Because P- and B-frames include less information than an I-frame and because a video stream having longer GOPs will include more P- and B-frames and fewer I-frames, longer GOPs tend to increase data compression in comparison to shorter GOPs.

If a video stream is encoded as a series of I-pictures without P- or B-frames, I-frames may be selected and deleted as needed to reduce bandwidth consumed by the stream and to thereby reduce the frame rate. If the GOP length (the number of P and B frames after each I frame plus one I frame) is set so that the desired frame rate and bandwidth reduction can be obtained by deleting just P- and B-frames, then the P- and B-frames can be deleted as needed to reduce bandwidth consumed by the stream. As an example, assume the user is facing the center of one screen and that there are a total of four screens so that screen that the user is facing occupies a 90 degree field of view. Assume also that the corresponding video stream is initially encoded at 30 fps with a GOP length of six, meaning that each GOP includes one I-frame and five P- or B-frames. Many different allocations of bandwidth are possible; however just one is presented for illustration. Deleting all P- and B-frames from the video delivered to the two screens at the sides of the user's head would reduce the frame rate by a factor of six, resulting in an effective frame rate of 5 fps. However, since P- and B-frames are smaller than I frames, this can be expected to reduce the bandwidth of the side video streams by about 50%. If the video stream delivered to the screen at the back of the user's head is reduced to 1 fps, this reduction can be made by deleting all P and B frames and four out of five of the I-frames. This results in a bandwidth reduction of about 90% for that stream. Overall, based on the reduction from the sides and the back, an overall reduction of about (0%+50%+50%+90%)/4=47.5% may be obtained.

Where the user is facing a corner of the display cube, in order to provide at least a 90-degree field of view, the two streams displayed at the two corner screens should receive the same, higher bandwidth allocation in comparison to the other streams. If both video streams presented on the sides of the corner are left unchanged, and the two rear videos are reduced to 1 fps, an overall reduction of (0%+0%+90%+90%)/4=45% may be obtained.

If the video is coded with a GOP length larger than the minimum frame rate reduction desired, reducing bandwidth by dropping frames becomes more complicated. This is because a P-frame depends not only on the most recent I-frame, but all of the P-frames between it and the most recent I-frame. Likewise, B-frames depend on successive B-frames and the next I-frame. Thus, to generate a new P frame between a set of I-frames, the information from a set of P-frames up to and including that point in the stream must be merged and recoded. While this will achieve bandwidth reduction, it is a less preferred technique since it will require more computation than the technique of deleting frames.

In the bandwidth reduction examples given above, the frame rate is set to one of three discrete rates: 30 fps, 5 fps, and 1 fps. However, it is preferable to use a more continuously variable method of reducing video quality and bandwidth. This is expected to provide more flexibility to the system and improve the overall video quality experienced by the remote participants and local user of the system. In the frame-rate reduction method used in the above examples, increased variability is most easily obtained for frame rates that are an integral division of the original frame rate divided by the GOP length (i.e. (Frame-Rate/GOP-Length)/n, where n=1, 2, 3 ... ). In the examples with an original frame rate of 30 and a GOP length of 6 this would correspond to possible frame rates of 5 fps, 2.5 fps, 1.667 fps, 1 1.25 fps, 1 fps, etc.

In the above discussions it is assumed that the video from a given video stream is handled uniformly. However, because in a system with four display screens, each video stream preferably covers a 90 degree field of view, ideally it would be preferred if the quality of an individual video stream varied continuously across its field of view as well. For example, in the example immediately above, the video streams adjacent to the corner were both at 30 fps while those adjacent to the opposite corner of the display cube were only 1 fps. This creates a large discontinuity in quality in the corners where the 30 fps and 1 fps streams meet. In a more continuous implementation, the quality and hence bandwidth could vary from left to right in a single stream, allowing a gradual tapering in quality and bandwidth around the display cube.

One way of achieving a smoother change in quality and bandwidth when using frame deletion is to not entirely delete a frame, but only delete information from one side of the frame. For example, instead of deleting five out of six I-frames in their entirety in a video stream, the left side of every other frame may be kept intact, effectively deleting one out of two on the left and five out of six on the right. Due to limitations of coding structure, if only part of a video frame is kept much of the overhead of the rest of the frame must usually be retained as well. This will tend to limit the bandwidth savings for such a technique of within-stream variation.

Figure 9:
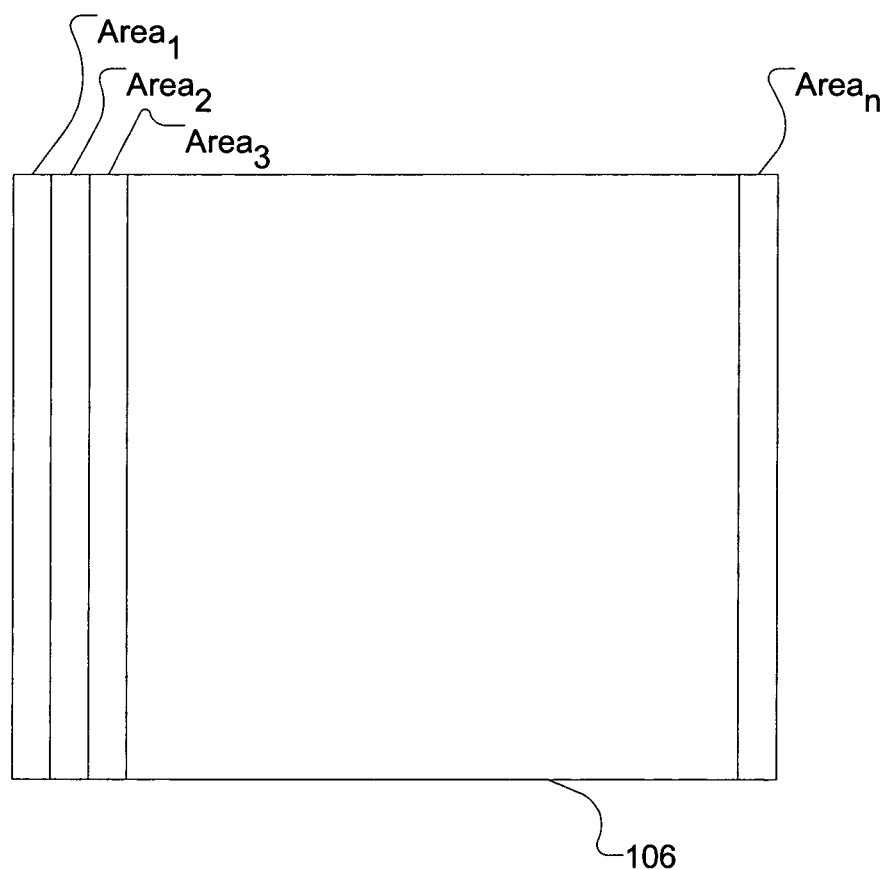
FIG. 9 shows a display screen divided into a plurality of display areas in accordance with an embodiment of the present invention.

More generally, each screen may be divided into a plurality of display areas. The quality of the video images displayed is uniform within each display area, but varies from display area to display area. FIG. 9 illustrates a display screen 106 that is divided into a plurality of display areas $Area_1$, $Area_2$, ..., $Area_n$. In the example above, the screen 106 is divided into two areas and the quality is adjusted based on frame rate. However, the screen 106 may be divided into additional areas while the frame rate may be adjusted differently for each area.

For example, where a first screen is divided into four areas, $Area_1$, $Area_2$, $Area_3$ and $Area_4$, each area occupies 22.5 degrees of the viewer's field of view. Assuming $Area_3$ is directly in front of the viewer, then $Area_2$, $Area_3$ and $Area_4$ may each receive 30 fps, while $Area_1$ may receive 2.5 fps since it is further into the periphery of the user's field of view. For a second screen adjacent to the first screen and having the same divisions, $Area_1$ of the adjacent screen will be adjacent to $Area_4$ of the first screen and may also receive 2.5 similarly to $Area_1$ of the first screen. In an embodiment where quality of the video images is adjustable in areas that occupy less than 90 degrees of the user's field of view, the highest quality video images may also occupy less than 90 degrees of the user's field of view. Thus, in the example above, three areas which received 30 fps occupy a total of 66.7 degrees of the field of view.

In the examples above, the quality of the video images and, thus, the bandwidth allocations, are controlled by controlling the frame rate for display areas, where the display areas occupy an entire screen or a portion of a screen. Similarly, other techniques for controlling the quality of video images and bandwidth allocations can be used to control the quality of video images for an entire screen or a portion of the screen.

For example, image quality for display areas may be controlled by limiting the number of bits used for encoding each pixel in a selected display area. For example, for some video encoding schemes a number of bits (e.g., 8 bits) are allocated for each of red, green and blue colors for each pixel. The image quality for a selected display area (and, thus, the bandwidth required for communicating data for the display area) may be reduced by limiting the number of bits. For example, for display areas in front of the user, all eight bits may be used for each of the red, green and blue colors for each pixel. For display areas in the periphery of the user's field of view, fewer bits may be used, e.g., 7, 6, 5, etc. Because fewer bits are used for each color, the color resolution is lower.

The spatial resolution of an MPEG-encoded image may be reduced by deleting high frequency discrete cosine transform (DCT) coefficients. Starting with deleting the highest frequency components, when progressively lower frequency components are deleted, the bandwidth required to transmit the image will be further reduced as the spatial resolution of the image will be further reduced.

For other encoding techniques in which luminance and chrominance values are each encoded for each pixel, the image quality (and, thus, bandwidth required) may be controlled by limiting the number of bits assigned to either or both of these values for each pixel. For example, the number of bits assigned to the luminance value for each bit within a selected display area may be limited which will tend to reduce the contrast of the images. As another example, the chrominance values may be eliminated altogether, which will cause monochrome images to be displayed.

In another embodiment, rather than limiting the number of bits used to encode pixels within a selected display area to reduce the bandwidth required to communicate the video images for that display area, the number of pixels for which values are communicated may be limited. For example, where an entire image includes 1024×768 pixels, and each screen is divided into equally-sized four display areas, each display area may be assigned at most 256×768 pixels. Thus, a display area directly in front of the user may receive data for 256×768 pixels. However, a display area in the periphery of the user's field of view may receive data for fewer pixels, e.g., 128×384 pixels. Values for the missing pixels may then be derived from the received pixels using standard techniques for interpolation. This will tend to reduce spatial resolution.

In the examples above and as shown in FIG. 9 each display area encompasses a vertical strip of a display screen. Thus, where the orientation of the user's head is determined only in the horizontal plane, then each display area preferably encompasses an entire vertical strip of an image. However, where the orientation of the user's head is determined in the vertical direction, so that it can be determined whether the user is looking up or down, then the images may be divided horizontally for the display areas. In this case, quality of the video images for a display area can vary with the vertical location of the display area. Also, because human vision sees more below the plane of the eyes than above, roll, or the person leaning their head to one side or the other may also be used to affect the desired image quality distribution. For example, if the user leans toward the left so that the area below the plane of the eyes encompasses less of the display areas to the left of the person, the quality for to those display areas may be reduced.

A system with more continuously variable bandwidth may tradeoff video quality and required bandwidth by a function of the angle such that an overall bandwidth target was achieved. An example function could be that each of the display areas is allocated bandwidth that is approximately equal to (Bt/N)*(1+cos(theta)), where theta is the angle from the front of the user's head to a particular display area, N is the number of display areas and Bt is the total bandwidth for all of the display areas (either from the user to the remote location or vice versa). Thus, in a system where there are four display areas, N is equal to four so that (Bt/4)*(1+cos(theta)). In a system where the available bandwidth is split equally, each video stream would get Bt/4 or one quarter of the total bandwidth. However, where the bandwidth is adjusted by this exemplary function, a view closely aligned to the front of the user's head could obtain twice the bandwidth (1+cos(0°))=2, areas directly to the side could get their original bandwidth (1+cos(90°)) or (1+cos(−90°))=1, and areas to the rear of the user's head would receive very little bandwidth. In the case of video of or directed towards the back of a user's head, 1+cos (180°)=1−1=0. Having a zero bandwidth or a bandwidth below a certain minimum value may be undesired, so a minimum bandwidth value may be set (e.g., at 1 fps) regardless of the value obtained from the equation above. Other variations, such as more steeply or less steeply directing bandwidth towards the front versus the sides of a user's head by using different functions may also be used.

As mentioned, location information may be used to control bandwidth instead of or in addition to controlling bandwidth based on other pose variables. For example, if the person's head is closer to a particular display screen, then higher bandwidth could be directed to that screen with lower bandwidth directed to screens that are further from the user. The higher bandwidth may be used to display the video images with greater spatial resolution, while the lower bandwidth may be used to display the video images with lower spatial resolution. Other bandwidth control techniques, such as frame rate reduction, may be used based on the position of the user's head.

To determine the position of the user's head 108 in two dimensions or three dimensions relative to the first and second camera sets, several techniques may be used. For example, conventionally known near-infrared (NIR) difference keying or chroma-key techniques may be used with the camera sets 112, which may include combinations of near-infrared or video cameras. The position of the user's head is preferably monitored continuously so that new values for its position are provided repeatedly.

Figure 10:
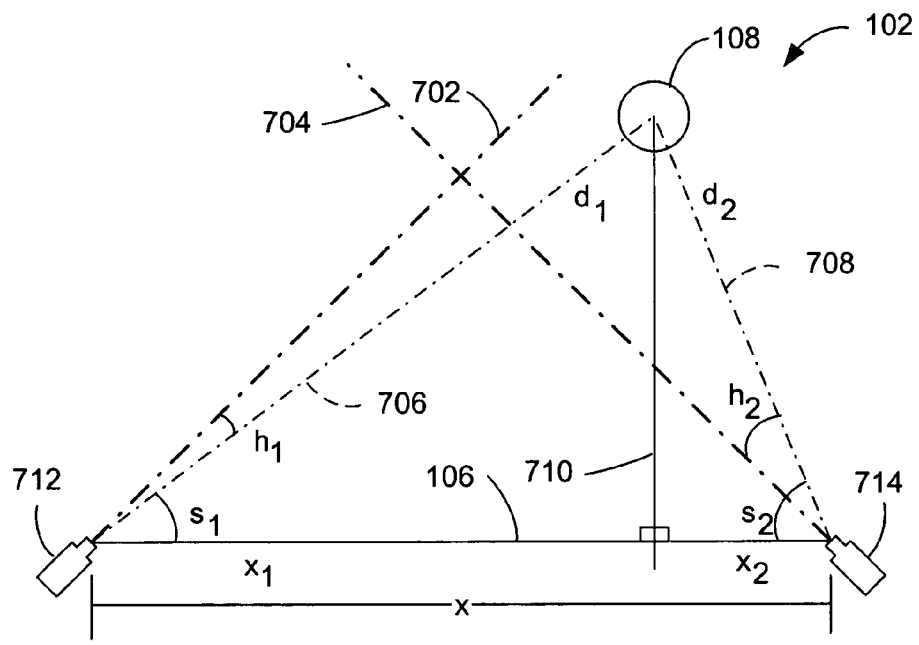
FIG. 10 illustrates a view from above at a user's location according to an embodiment of the present invention.

Referring now to FIG. 10, therein is shown the user's location (e.g., in display booth 102) looking down above. In this embodiment, first and second camera sets 712 and 714 are used as an example. The distance x between the first and second camera sets 712 and 714 is known, as are angles $h_1$ and $h_2$ between centerlines 702 and 704 of sight of the first and second camera sets 712 and 714, and centerlines 706 and 708 respectively to the user's head 108.

Figure 11:
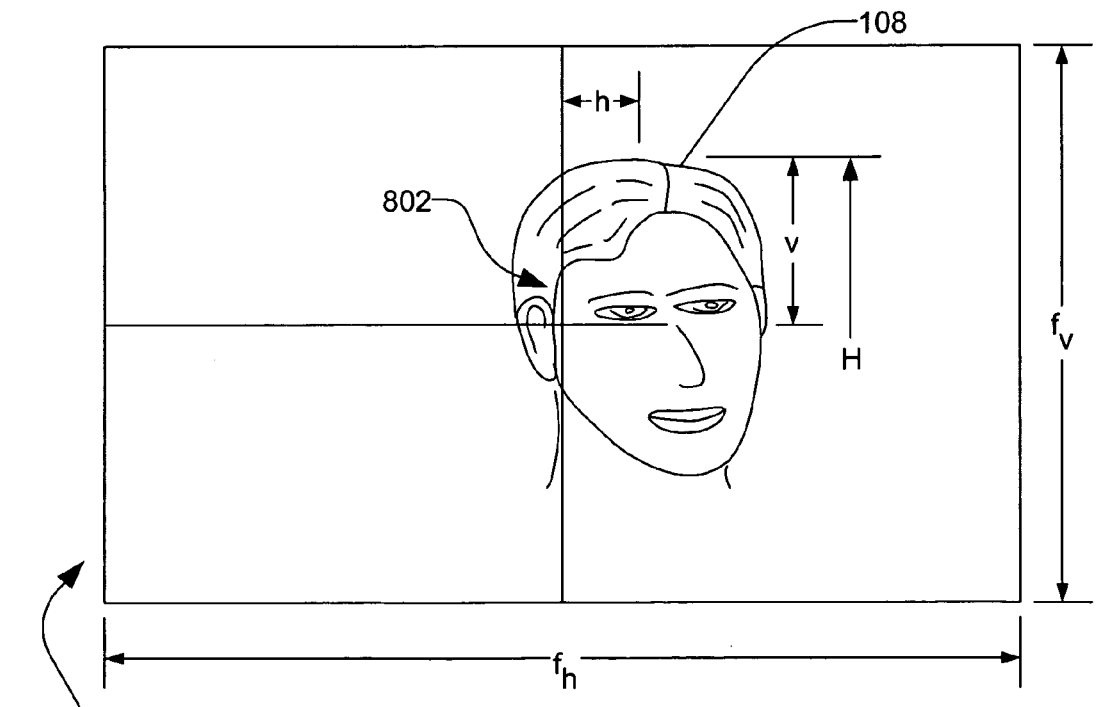
FIG. 11 illustrates a view from one of the cameras of the display apparatus according to an embodiment of the present invention.

The centerlines 706 and 708 can be determined by detecting the location of the user's head within images obtained from each camera set 712 and 714. Referring to FIG. 11, therein is shown a user's image 800 from either the first and second camera sets 712 or 714 mounted beside the user's display 106 used in determining the user's head location. For example, where luminance keying is used, the near-infrared light provides the background that is used by a near-infrared camera in detecting the luminance difference between the head of the user and the rear projection screen. Any luminance detected by the near-infrared camera outside of a range of values specified as background is considered to be in the foreground. Once the foreground has been distinguished from the background, the user's head may then be located in the image. The foreground image may be scanned from top to bottom in order to determine the location of the user's head. Preferably, the foreground image is scanned in a series of parallel lines (i.e. scan lines) until a predetermined number, h, of adjacent pixels within a scan line, having a luminance value within foreground tolerance are detected. In an exemplary embodiment, h equals 10. This detected region is assumed to be the top of the local user's head. By requiring a number of adjacent pixels to have similar luminance values, the detection of false signals due to video noise or capture glitches are avoided. Then, a portion of the user's head preferably below the forehead and approximately at eye-level is located. This measurement may be performed by moving a distance equal to a percentage of the total number of scan lines (e.g., 10%) down from the top of the originally detected (captured) foreground image. The percentage actually used may be a user-definable parameter that controls how far down the image to move when locating this approximately eye-level portion of the user's head.

A middle position between the left-most and right-most edges of the foreground image at this location indicates the locations of the centerlines 706 and 708 of the user's head. Angles $h_1$ and $h_2$ between centerlines 702 and 704 of sight of the first and second camera sets 712 and 714 and the centerlines 706 and 708 to the user's head shown in FIG. 10 can be determined by a processor comparing the horizontal angular position h to the horizontal field of view of the camera $f_h$ shown in FIG. 11. The combination of camera and lens determines the overall vertical and horizontal fields of view of the user's image 800.

It is also known that the first and second camera sets 712 and 714 have the centerlines 702 and 704 set relative to each other; preferably 90 degrees. If the first and second camera sets 712 and 714 are angled at 45 degrees relative to the user's display screen, the angles between the user's display screen and the centerlines 706 and 708 to the user's head are $s_1=45-h_1$ and $s_2=45+h_2$. From trigonometry:

$$x_1 * \tan s_1 = y = x_2 * \tan s_2 \quad \text{Equation 1}$$

and $$x_1 + x_2 = x \quad \text{Equation 2}$$

so $$x_1 * \tan s_1 = (x - x_1) * \tan s_2 \quad \text{Equation 3}$$

regrouping $$x_1 * (\tan s_1 + \tan s_2) = x * \tan s_2 \quad \text{Equation 4}$$

solving for $x_1$ $$x_1 = (x * \tan s_2) / (\tan s_1 + \tan s_2) \quad \text{Equation 5}$$

The above may also be solved for $x_2$ in a similar manner. Then, knowing either $x_1$ or $x_2$, y is computed. To reduce errors, y 710 may be computed from both $x_1$ and $x_2$ and an average value of these values for y may be used.

Then, the distances from each camera to the user can be computed as follows:

$$d_1 = y/\sin s_1 \quad \text{Equation 6}$$

$$d_2 = y/\sin s_2 \quad \text{Equation 7}$$

In this way, the position of the user can be determined in two dimensions (horizontal or X and Y coordinates) using an image from each of two cameras. To reduce errors, the position of the user can also be determined using other sets of cameras and the results averaged.

Referring again to FIG. 11, therein is shown a user's image 800 from either the first and second camera sets 712 or 714 mounted beside the user's display 102 which may be used in determining the user's head height. Based on this vertical field of view of the camera set and the position of the user's head 108 in the field of view, a vertical angle v between the top center of the user's head 108 and an optical center 802 of the user's image 800 can be computed by a processor. From this, the height H of the user's head 108 above a floor can be computed. U.S. patent application Ser. No. 10/376,435, filed Feb. 2, 2003, the entire contents of which are hereby incorporated by reference, describes a telepresence system with automatic preservation of user head size, including a technique for determining the position of a user's head in two or three dimensions.

Recall that the surrogate 300 (FIG. 3) displays images of the user at a location that is remote from the user. Just as the user does not require presentation of high-quality video behind their head, the view of the back of their head at the remote location does not need to be presented in as high quality as the front or sides of their head. This is because people's faces are used to communicate in many different ways, some of which are subtle when viewed from the front, while the sides and back of people's heads convey relatively little information. For example, the front view of someone's head contains gaze information from their eyes. Gaze is an important human communication channel, and is used for coordinating turn taking in conversations, expressing attention and interest, etc. The front of a person's head is their face and contains facial expressions, which is also an important channel in human communication. Meanwhile, dynamic motion of people's hair is not used in most business communication. The information content of a profile of a person's head is somewhere between that of the front of their head and the back of their head. Information about a person's gaze in profile view is generally not discernable unless they are looking at an extreme angle in the direction of the profile observer. The ability to read facial expressions in profile view is also diminished, although major expressions such as smiles are still discernable.

Thus, the situation for video streamed from the user to the remote location is quite analogous to that streamed from the remote location to the user. In both cases, peak quality and bandwidth is needed in the direction of the front of the user's head, with quality needs decreasing and opportunities for bandwidth reduction increasing as the video is oriented closer to the back of the user's head.

All of the bandwidth reduction methods discussed in the section on reducing bandwidth from the remote location to the user are also applicable in reducing the bandwidth going to the remote location and all can be based on the same determined orientation of the user's head. For example, bandwidth reduction requirements may be met by reducing the frame rate, though other bandwidth reduction techniques may used either singly or in combination.

In the preferred display booth 102 (FIG. 1) having four display screens 106 the cameras 112 for capturing video of the user's head are preferably located at the corners of the display booth 102. Therefore, the cameras 112 are rotated 45 degrees with respect to the center of the display screens 106. Thus, the video images of the user are rotated 45 degrees with respect to the video images of the remote location. Thus, in the example of controlling the frame rate, if the user's head is directed within +/−22.5 degrees of the corner of a display cube, the video images taken by that corner are preferably sent at a full bandwidth of 30 fps and a GOP length of 5. Video images obtained from the corners on either side of the user's head may be sent with all P and B frames dropped, for a resulting frame rate of 5 fps and a 50% reduction in bandwidth. Meanwhile, the view of the back of their head could be sent at 1 fps by skipping all P and B frames and 4 out of 5 I frames to save 90% of the original bandwidth. This would result in an overall bandwidth reduction of 47.5%. Similarly, if a user was facing the center of a screen +/−22.5 degrees and is therefore presenting an angled view of the front of their face to two cameras video images obtained from these two cameras could be sent at the highest quality or 30 fps. Reducing the bandwidth from the remaining two cameras (capturing an angled view of the back of the user's head) by 90% would leave these video streams with a frame rate of 1 fps. Then the overall bandwidth savings would be 45%.

The above detailed description of the present invention has been presented for the purpose of illustration and description. Although the present invention has been described with respect to specific embodiments, various changes and modifications may be suggested. It is intended that the present invention encompass such changes and modifications as fall within the scope of the claims appended hereto.

What is claimed is:

1. A video display system comprising:
a display apparatus having a first plurality of display areas at a first location for displaying video images to a person at the first location, wherein the display apparatus comprises a second plurality of display areas at a second location for at least displaying video images of the person to the second location; and
a computer system for determining a pose of the head of the person and for controlling quality of the video images displayed by each display area at the first location based on the pose of the head of the person, wherein a quality of video images displayed in a front view of the head of the person is greater than other displayed areas around the person, and wherein the computer system is configured to control quality of the video images of the person displayed by each display area at the second location based on the pose of the head of the person at the first location, wherein a quality of video images displayed at the second location of a front view of the head of the person is greater than other views of the head of the person displayed at the second location.

2. The system according to claim 1, wherein a larger portion of bandwidth is used to display images in the front view of the head of the person than bandwidth used to display images at a side view of the head of the person.

3. The system according to claim 2, wherein each display screen corresponds to one display area.

4. The system according to claim 2, wherein each display screen includes multiple display areas.

5. The system according to claim 1, wherein the display areas at the first location completely surround the person.

6. The system according to claim 1, wherein quality of the video images displayed by each display area is controlled based on the orientation of the head of the person.

7. The system according to claim 6, wherein frame rate of the video images displayed by each display area is controlled based on the orientation of the head of the person.

8. The system according to claim 6, wherein spatial resolution of the video images displayed by each display area is controlled based on the orientation of the head of the person.

9. The system according to claim 6, wherein color resolution of the video images displayed by each display area is controlled based on the orientation of the head of the person.

10. The system according to claim 1, wherein contrast of the video images displayed by each display area is controlled based on the orientation of the head of the person.

11. The system according to claim 1, wherein the quality of the video images displayed in at least a horizontal ninety-degree field of view for the person is higher than other display areas at the first location.

12. The system according to claim 1, wherein the first plurality of display areas of the display apparatus comprises four display screens and wherein the quality of the video images displayed by each screen is the same for the entire screen.

13. The system according to claim 1, wherein each of the display areas is allocated bandwidth that is approximately equal to $(Bt/N)*(1+\cos(theta))$, where theta is an angle from the front of the user's head to a particular display area, N is the number of display areas and Bt is the total bandwidth for all of the display areas.

14. The system according to claim 1, wherein the pose of the head of the person is determined repeatedly.

15. The system according to claim 1, wherein the computer system determines the pose of the head of the person from images of the person.

16. The system according to claim 15, wherein the orientation of the head of the person is obtained by assigning values to a plurality of positions in a polar plot using data from the images of the person and computing a centroid based on the assigned values.

17. The system according to claim 1, wherein quality of the video images displayed by each display area is controlled based on the position of the head of the person.

18. The system according to claim 1, wherein the computer system is configured to reduce bandwidth consumption by degrading quality of the video images of the other displayed areas around the person at the first location to below an initial state, and by degrading quality of the video images of the other views of the head of the person displayed at the second location to below an initial state.

19. The system according to claim 1, wherein the pose of the head of the person comprises a distance of the head from a camera.

20. The system according to claim 1, wherein in addition to the computer system being configured to control quality of the video images displayed based on the pose of the head of the person, the computer system is also configured to control quality of the video images displayed based on a distance of the head of the person from a camera.

21. The system according to claim 1, comprising a surrogate disposed at the second location, wherein the surrogate comprises a surrogate of the person at the first location.

22. The system according to claim 21, wherein the surrogate comprises the second plurality of display areas.

23. The system according to claim 21, wherein the surrogate displays more than one view of the person.

24. The system according to claim 21, wherein the surrogate comprises a surrogate head, an upper body, and a lower body.

25. The system according to claim 24, wherein the surrogate head comprises a surrogate face display.

26. The system according to claim 24, wherein the upper body of the surrogate is configured to move to simulate height of the person.

27. A video display system comprising:
a display apparatus having a plurality of display areas for displaying video images to a person; and
a computer system comprising a processor and a stored software program, the computer system configured to determine a pose of the head of the person and to control quality of the video images displayed by each display area based on the pose of the head of the person, wherein a quality of video images displayed in a front view of the head of the person is greater than other video images displayed areas around the person, and wherein frame rate of the video images displayed by each display area is controlled based on the pose.

28. The system according to claim 27, wherein the computer system is configured to degrade the quality of the other video images displayed around the person via deleting information from only one side of the frames in the other video images to reduce frame rate of the other video images.

29. The system according to claim 27, wherein the computer system is configured to degrade the quality of the other video images displayed around the person via displaying the other video images in monochrome.

30. The system according to claim 27, wherein a larger portion of bandwidth available for displaying images of the person at a remote location is devoted to displaying images at the remote location of the front of the head of the person, and a smaller portion of the bandwidth is devoted to display of images at the remote location of sides and back of the head of the person.

31. The system according to claim 27, wherein the computer system is configured to control quality of video images of the person displayed by remote display areas at a remote location based on the pose of the head of the person, wherein a quality of video images displayed at the remote location of a front view of the head of the person is greater than other views of the head of the person displayed at the remote location, and wherein the computer system is configured to control quality of the video images displayed by each display area based on a distance of the head of the person from a camera.

32. A video display system comprising:
a display apparatus having a plurality of display areas configured to display video images to a person; and
a computer system comprising a video capture card, the computer system configured to determine a pose of the head of the person and to control quality of the video images displayed by each display area based on the pose of the head of the person, wherein a quality of video images displayed in a front view of the head of the person is greater than other displayed areas around the person, and wherein the pose comprises a distance of the head from a camera independent of a direction of the head.

33. The system according to claim 32, wherein the computer system is configured to control quality of the video images of the person displayed by remote display areas at a remote location based on the pose of the head of the person, and wherein a quality of video images displayed at the remote location of a front view of the head of the person is greater than non-front views displayed at the remote location of the head of the person.

\* \* \* \* \*